United States Patent
Adkins et al.

(10) Patent No.: US 9,163,099 B2
(45) Date of Patent: Oct. 20, 2015

(54) POLYBUTADIENE MODIFIED POLYMER POLYOLS, FOAMS PREPARED FROM POLYBUTADIENE MODIFIED POLYMER POLYOLS, AND PROCESSES FOR THE PRODUCTION THEREOF

(71) Applicant: Bayer MaterialScience LLC, Pittsburgh, PA (US)

(72) Inventors: Rick L. Adkins, Canonsburg, PA (US); Brian L. Neal, Pittsburgh, PA (US); Daniel P. Krisher, South Charleston, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 119 days.

(21) Appl. No.: 13/790,249

(22) Filed: Mar. 8, 2013

(65) Prior Publication Data

US 2014/0256839 A1 Sep. 11, 2014

(51) Int. Cl.
| | |
|---|---|
| *C08F 8/00* | (2006.01) |
| *C08G 65/48* | (2006.01) |
| *C08G 18/48* | (2006.01) |
| *C08G 18/69* | (2006.01) |
| *C08G 18/81* | (2006.01) |
| *C08G 18/63* | (2006.01) |
| *C08G 18/64* | (2006.01) |
| *C08G 101/00* | (2006.01) |

(52) U.S. Cl.
CPC . *C08F 8/00* (2013.01); *C08G 18/48* (2013.01); *C08G 18/4845* (2013.01); *C08G 18/4883* (2013.01); *C08G 18/69* (2013.01); *C08G 18/81* (2013.01); *C08G 65/48* (2013.01); *C08G 2101/00* (2013.01)

(58) Field of Classification Search
CPC ..... C08G 18/63; C08G 18/632; C08G 18/638
USPC ................................ 521/170, 174; 525/333.2
See application file for complete search history.

(56) References Cited

U.S. PATENT DOCUMENTS

| | | | |
|---|---|---|---|
| 3,383,351 A | 5/1968 | Stamberger | |
| 3,652,639 A | 3/1972 | Pizzini et al. | |
| 3,823,201 A | 7/1974 | Pizzini et al. | |
| 3,850,861 A | 11/1974 | Fabris et al. | |
| 3,931,092 A | 1/1976 | Ramlow et al. | |
| RE28,715 E | 2/1976 | Stamberger | |
| RE29,118 E | 1/1977 | Stamberger | |
| 4,014,846 A | 3/1977 | Ramlow et al. | |
| 4,093,573 A | 6/1978 | Ramlow et al. | |
| 4,148,840 A | 4/1979 | Shah | |
| 4,172,825 A | 10/1979 | Shook et al. | |
| 4,208,314 A | 6/1980 | Priest et al. | |
| 4,242,249 A | 12/1980 | Van Cleve et al. | |
| 4,342,840 A | 8/1982 | Kozawa et al. | |
| 4,390,645 A | 6/1983 | Hoffman et al. | |
| 4,394,491 A | 7/1983 | Hoffman et al. | |
| 4,454,255 A | 6/1984 | Ramlow et al. | |
| 4,458,038 A | 7/1984 | Ramlow et al. | |
| 4,460,715 A | 7/1984 | Hoffman et al. | |
| 4,463,107 A | 7/1984 | Simroth et al. | |
| 4,550,194 A | 10/1985 | Reichel et al. | |
| 4,652,589 A | 3/1987 | Simroth et al. | |
| 4,745,153 A | 5/1988 | Hoffman | |
| RE32,733 E | 8/1988 | Simroth et al. | |
| 4,997,857 A | 3/1991 | Timberlake et al. | |
| 5,011,908 A * | 4/1991 | Hager | 528/392 |
| 5,196,476 A | 3/1993 | Simroth | |
| 5,814,699 A | 9/1998 | Kratz et al. | |
| 5,990,185 A | 11/1999 | Fogg | |
| 6,013,731 A | 1/2000 | Holeschovsky et al. | |
| 6,455,603 B1 | 9/2002 | Fogg | |
| 6,855,742 B2 * | 2/2005 | Hager et al. | 521/130 |
| 7,160,975 B2 | 1/2007 | Adkins et al. | |
| 7,179,882 B2 | 2/2007 | Adkins et al. | |
| 7,759,423 B2 | 7/2010 | Chauk | |
| 7,776,969 B2 | 8/2010 | Adkins | |
| 2006/0025491 A1* | 2/2006 | Adkins et al. | 521/155 |
| 2009/0281206 A1 | 11/2009 | Van der Wal et al. | |

FOREIGN PATENT DOCUMENTS

| | | |
|---|---|---|
| EP | 0786480 B1 | 7/2003 |
| GB | 1126025 | 9/1968 |
| JP | 48101494 | 12/1973 |
| JP | 52005887 | 1/1977 |
| WO | 2012017016 A1 | 2/2012 |

* cited by examiner

Primary Examiner — Melissa Rioja
(74) Attorney, Agent, or Firm — N. Denise Brown

(57) ABSTRACT

This invention relates to polybutadiene modified polymer polyols which comprise one or more base polyols, at least one preformed stabilizer, one or more ethylenically unsaturated monomers, and polybutadiene, in the presence of at least one free radical polymerization catalyst, and optionally, one or more chain transfer agents. The polybutadiene present in these polybutadiene modified polymer polyols may be carried into the polymer polyol through the preformed stabilizer, by a polybutadiene containing component that is added separately from the preformed stabilizer to the polymer polyol, or a combination thereof, with the total amount of polybutadiene ranging from 0.03 to 1.0% by weight of polybutadiene, based on 100% by weight of the polymer polyol. The present invention also relates to processes for preparing these polybutadiene modified polymer polyols, to foams prepared from these polybutadiene modified polymer polyols, and to processes for producing foams from these polybutadiene modified polymer polyols.

28 Claims, No Drawings

POLYBUTADIENE MODIFIED POLYMER POLYOLS, FOAMS PREPARED FROM POLYBUTADIENE MODIFIED POLYMER POLYOLS, AND PROCESSES FOR THE PRODUCTION THEREOF

BACKGROUND OF THE INVENTION

This invention relates to polybutadiene modified polymer polyols, foams comprising these polybutadiene modified polymer polyols, and to processes for the production thereof.

Various types of filled polyols are known and described in the art. Filled polyols are typically stable dispersions of solid particles in a liquid base polyol. More specifically, the known filled polyols include, for example, polyisocyanate polyaddition (i.e. PIPA) polyols, polyurea and/or polyhydrazodicarbonamide (i.e. PHD) polyols and polymer (i.e. PMPO) polyols.

The basic patents relating to such polymer polyol compositions are Stamberger, U.S. Patent. Re. 28,715 (reissue of U.S. Pat. No. 3,383,351) and U.S. Patent. Re. 29,118 (reissue of U.S. Pat. No. 3,304,273). As described therein, a stable dispersion of polymer particles in a polyol can be produced by polymerizing one or more ethylenically unsaturated monomer dissolved or dispersed in a polyol in the presence of a free radical catalyst.

Since then, numerous patents have issued which describe various advances such as increasing solids contents, decreasing viscosity, enhancing stability, etc. in polymer polyols. These patents include, for example, U.S. Pat. Nos. 3,652,639, 3,823,201, 3,850,861, 3,931,092, 4,014,846, 4,093,573, 4,148,840, 4,172,825, 4,208,314, 4,242,249, 4,342,840, 4,390,645, 4,394,491, 4,454,255, 4,458,038, 4,460,715, 4,550,194, 4,652,589, 4,745,153, 4,997,857, 5,196,476, 5,814,699, 5,990,185, 6,455,603, 7,160,975, 7,179,882, 7,759,423 and Re 32,733 (reissue of U.S. Pat. No. 4,463,107).

It is known that the filled polyols are suitable isocyanate-reactive components for the preparation of polyurethane materials such as foams, elastomers, etc. The two major types of polyurethane foams are termed slabstock foams and molded foams. Slabstock foams are used in the carpet, furniture and bedding industries. Primary uses of slabstock foam are as carpet underlay and furniture padding. In the molded foam area, high resiliency (HR) molded foam is the most common type foam made commercially. HR molded foams are used in the automotive industry for a breadth of applications ranging from molded seats to energy-absorbing padding and the like. As the demand for polymer polyols has increased, and the need for better and improved properties in the polymer polyols has increased, new advances in polymer polyol technology have been achieved.

In spite of advances in reduction in viscosity and increased solids contents of polymer polyols, a need for further improvement in viscosity reduction and increase in solids content has continued to exist. In particular, there is a need for technology in polymer polyols that maximizes viscosity reduction while also providing a viable mechanism to higher solids content, while enhancing the stability of the polymer polyols.

One way of enhancing stability of polymer polyols is by the presence of a minor amount of a graft or addition copolymer formed in situ from growing polymer chains and polyol molecules. Various approaches are known in the art. These typically incorporate small amounts of unsaturation into the polyol in addition to that inherently present in the polyoxyalkylene polyols typically used in forming polymer polyols. Various patents including U.S. Pat. Nos. 3,652,639, 3,823,201, and 3,850,861, British Patent 1,126,025 and Japanese Patent Nos. 52-005887 and 48-101494 utilize this approach. The use of "stabilizer precursors," also termed a "macromer" that contains a particular level of reactive unsaturation, is based on the expectation that during polymerization, in the preparation of the polymer polyol, adequate amounts of stabilizer will be formed by the addition polymerization of the precursor stabilizer with a growing polymer chain. U.S. Pat. Nos. 4,454,255, 4,458,038 and 4,460,715 describe the general concept of using stabilizer precursors in polymerization.

A pre-formed stabilizer (PFS) is known to be particularly useful for preparing a polymer polyol having a lower viscosity at high solids content. In the pre-formed stabilizer processes, a macromer is reacted with monomers to form a co-polymer composed of macromer and monomers. These co-polymers comprising a macromer and monomers are commonly referred to as pre-formed stabilizers (PFS). Reaction conditions may be controlled such that a portion of the co-polymer precipitates from solution to form a solid. Pre-formed stabilizers may be dispersions having low solids contents (e.g., 3 to 15% by weight). It is preferred that the reaction conditions under which pre-formed stabilizers are prepared are controlled so that the particle size is small, thereby enabling the particles to function as "seeds" in the polymer polyol reaction.

U.S. Pat. Nos. 5,196,476, 5,990,185, 6,013,731, 7,160,975 and 7,776,969 as well as EP 0786480 describe a variety of pre-formed stabilizer composition. In general, these are prepared by polymerizing a macromer and one or more ethylenically unsaturated monomers in the presence of a free-radical polymerization initiator and a liquid diluent in which the pre-formed stabilizer is essentially insoluble.

The novel polybutadiene modified polymer polyols of the present invention offer distinct advantages that are not available from the present commercially available polymer polyols. These include improved flammability in foams prepared from these novel polymer polyols, and lower VOCs (volatile organic compounds) present in the foams compared to the present commercially available polymer polyols. It was surprisingly found that these advantages could be realized in polymer polyols by substituting either a polybutadiene for a portion of the liquid base polyol (typically a polyether polyol) in the composition of the polymer filled polyol, or by using a preformed stabilizer that comprises a polybutadiene. This has not previously been disclosed or suggested.

SUMMARY OF THE INVENTION

This invention relates to polybutadiene modified polymer polyols. These polybutadiene modified polymer polyols contain from 0.03 to 1.0% by weight, preferably from 0.1 to 0.5% by weight, based on 100% by weight of the polymer polyol, of polybutadiene. In accordance with the present invention, the polybutadiene may be incorporated into the polymer polyol through (i) the preformed stabilizer, or (ii) as a separate reactant along with the conventional reactants that are used to form polymer polyols.

These novel polybutadiene modified polymer polyols comprise the free-radical polymerization product of:
(A) one or more base polyols;
(B) at least one preformed stabilizer;
(C) one or more ethylenically unsaturated monomers; and
(D) polybutadiene;
in the presence of
(E) at least one free radical polymerization catalysts;
and, optionally, (F) one or more chain transfer agents;
wherein said polybutadiene is introduced into the polymer polyols through said preformed stabilizer and/or as a separate reactant, and said polybutadiene is present in the polymer polyol in an amount ranging from 0.03 to 1.0% by weight, based on 100% by weight of the polymer polyol.

These polybutadiene modified polymer polyols comprise the free-radical polymerization product of:
(A) one or more base polyols;
(B) at least one preformed stabilizer;
(C) one or more ethylenically unsaturated monomers; and
(D) from 0.03 to 1%, preferably from 0.1 to 0.5% by weight, based on 100% by weight of the polymer polyol, of polybutadiene;
in the presence of
(E) at least one free radical polymerization catalyst;
and, optionally,
(F) one or more chain transfer agents.

In an alternate embodiment, these polybutadiene modified polymer polyols comprise the free radical polymerization product of:
(A) one or more base polyols;
(B) at least one preformed stabilizer which comprises from 0.5 to 13%, preferably from 1% to 6% by weight, based on 100% by weight of the preformed stabilizer, of polybutadiene;
with
(C) one or more ethylenically unsaturated monomers;
in the presence of
(E) at least one free radical polymerization catalyst;
and, optionally,
(F) one or more chain transfer agents.

The present invention also relates to processes for the production of polybutadiene modified polymer polyols.

The process of producing these polybutadiene modified polymer polyols comprises (I) free radically polymerizing (A) one or more base polyols; (B) at least one preformed stabilizer; (C) one or more ethylenically unsaturated monomers; and (D) polybutadiene; in the presence of (E) at least one free radical polymerization catalyst; and, optionally, (F) one or more chain transfer agents; wherein said polybutadiene is introduced into the polymer polyols through said preformed stabilizer and/or as a separate reactant, and said polybutadiene is present in the polymer polyol in an amount ranging from 0.03 to 1.0% by weight, based on 100% by weight of the polymer polyol.

Another embodiment of the process comprises (I) free radically polymerizing (A) one or more base polyols; (B) at least one preformed stabilizer; (C) one or more ethylenically unsaturated monomers; with (D) from 0.03 to 1% by weight, based on 100% by weight of the polymer polyol, of polybutadiene; in the presence of (E) at least one free radical polymerization catalyst; and, optionally, (F) one or more chain transfer agents.

In another embodiment, the process of producing the polybutadiene modified polymer polyols comprises (I) free radically polymerizing (A) one or more base polyols; (B) at least one preformed stabilizer which comprises from 0.5 to 13% by weight, based on 100% by weight of the preformed stabilizer, of polybutadiene; with (C) one or more ethylenically unsaturated monomers; in the presence of (E) at least one free radical polymerization catalyst; and, optionally, (F) one or more chain transfer agents.

Another aspect of the present invention relates to foams prepared from the above described polymer polyols. The foams comprise the reaction product of (1) a polyisocyanate component, with (2) an isocyanate-reactive component comprising the above described polybutadiene modified polymer polyols; in the presence of (3) at least one catalyst, (4) at least one blowing agent, and (5) at least one surfactant.

The present invention also relates to process for the production of foams from the above described polymer polyols. These processes comprise reacting (1) a polyisocyanate component, with (2) an isocyanate-reactive component comprising one of the above described polybutadiene modified polymer polyols; in the presence of (3) at least one catalyst, (4) at least one blowing agent, and (5) at least one surfactant.

DETAILED DESCRIPTION OF THE INVENTION

As used herein, the following terms shall have the following meanings.

The term pre-formed stabilizer is defined as an intermediate obtained by reacting a macromer containing reactive unsaturation (e.g. acrylate, methacrylate, maleate, etc.) with monomers (i.e. acrylonitrile, styrene, methyl methacrylate, etc.), optionally in a diluent or a solvent (i.e. methanol, isopropanol, toluene, ethylbenzene, polyether polyols, etc.) to give a co-polymer (dispersion having e.g. a low solids content (e.g. <25%), or soluble grafts, etc.).

The term "monomer" means the simple unpolymerized form of chemical compound having relatively low molecular weight, e.g., acrylonitrile, styrene, methyl methacrylate, and the like.

The phrase "free radically polymerizable ethylenically unsaturated monomer" means a monomer containing ethylenic unsaturation ($>C=C<$, i.e. two double bonded carbon atoms) that is capable of undergoing free radically induced addition polymerization reactions.

The term "stability" means the ability of a material to maintain a stable form such as the ability to stay in solution or in suspension.

The phrase "polymer polyol" refers to such compositions which are produced by polymerizing one or more ethylenically unsaturated monomers dissolved or dispersed in a polyol in the presence of a free radical catalyst to form a stable dispersion of polymer particles in the polyol. These polymer polyols have the valuable property of imparting to, for example, polyurethane foams and elastomers produced therefrom, higher load-bearing properties than are provided by the corresponding unmodified polyols.

As used herein "viscosity" is in millipascals-seconds (mPa·s) measured at 25° C. on an Anton-Paar Stabinger viscometer.

As used herein, the phrase polybutadiene modified polymer polyols refers to polymer polyols that contain from 0.03 to 1.0% (preferably 0.1 to 0.5%) by weight, based on 100% by weight of the polymer polyol, of polybutadiene. This polybutadiene may be incorporated into the polymer polyol through the preformed stabilizer, or the polybutadiene may be present as a separate reactant along with the conventional reactants that form polymer polyols, or a combination thereof.

Suitable polyols to be used as the base polyols (A) in the present invention include, for example, polyether polyols. Suitable polyether polyols include those having a functionality of at least about 2. The functionality of suitable polyether polyols is typically less than or equal to about 8, preferably less than or equal to about 7, more preferably less than or equal to 6, and most preferably less than or equal to about 5. The suitable polyether polyols may also have functionalities ranging between any combination of these upper and lower values, inclusive. The OH numbers of suitable polyether polyols is at least about 10, preferably at least about 15, more preferably at least about 15, and most preferably at least about 20. Polyether polyols typically also have OH numbers of less than or equal to about 1000, preferably less than or equal to about 500, more preferably less than or equal to about 200, and most preferably less than or equal to about 75. The suitable polyether polyols may also have OH numbers ranging between any combination of these upper and lower values, inclusive. The (number average) molecular weights of suitable polyether polyols is typically at least about 100, preferably at least about 225, more preferably at least about 560, and most preferably at least about 1,500. Polyether polyols typically have (number average) molecular weights of less than or equal to about 45,000, preferably less than or equal to about 26,200, more preferably less than or equal to about 22,500, and most preferably less than or equal to 14,000. The suitable base polyether polyols may also have (number average) molecular weights ranging between any combination of these upper and lower values, inclusive.

The polyether polyols used as the base polyol may optionally have low levels of unsaturation. When low unsaturation polyols are used as the base polyol, the unsaturation level of the base polyols is typically at least about 0.001 meq/g, preferably at least about 0.001, and most preferably at least about 0.002. Suitable base polyether polyols also typically have unsaturation levels of less than or equal to 0.1, preferably less than or equal to 0.09 and most preferably less than or equal to 0.08. The suitable base polyether polyols may also have an unsaturation level ranging between any combination of these upper and lower values, inclusive.

These polyether polyols may also have functionalities ranging from about 2 to about 8, preferably from about 2 to about 7, more preferably about 2 to 6, and most preferably from about 2 to about 5; OH numbers ranging from about 10 to 1000, preferably from about 15 to about 500, more preferably from about 15 to about 200, and most preferably from about 20 to about 75; (number average) molecular weights ranging from about 100 to about 45,000, preferably about 225 to about 26,200, more preferably about 560 to about 22,500, and most preferably about 1,500 to about 14,000.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

OH=(56.1×1000×$f$)/mol. wt.

wherein:
OH: represents the hydroxyl number of the polyol,
f: represents the functionality of the polyol, i.e. the average number of hydroxyl groups per molecule of polyol, and
mol. wt. represents the molecular weight of the polyol.

Examples of such compounds include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethyolpropane, glycerol, pentaerythritol, sorbitol, sucrose, ethylenediamine, toluene diamine, etc. By alkoxylation of the starter, a suitable polyether polyol for the base polyol component can be formed.

Other suitable polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxy-butane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2,4-tirhydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxyphenyl)propanes, condensation products of various phenolic compounds and glyoxal, glutaraldehyde, other dialdehydes, including the 1,1,2,2-tetrakis(hydroxyphenol) ethanes, etc.

The alkylene oxide adducts of phosphorus and polyphosphorus acid are also useful polyols, These include ethylene oxide, 1,2-epoxypropane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

Suitable base polyols also include those low unsaturation polyols as described in, for example, U.S. Pat. Nos. 3,278,457, 6,008,263, and 6,066,683, the disclosures of which are hereby incorporated by reference.

Any of the previously mentioned polyols can also be used to form the macromer component of the preformed stabilizer (B). When a mixture of oxides (such as PO and EO) is used, then the resultant polyol can be either EO terminated or PO terminated. If PO terminated, then the two oxides can be fed simultaneously or as oxide blocks, with the requirement that the final portion of the feed by pure PO. Polymerization catalysts can be either traditional base or acid catalysts or a double metal cyanide catalyst such as disclosed in U.S. Pat. No. 6,013,731, the disclosure of which is hereby incorporated by reference.

In accordance with the present invention, it is preferred that polybutadiene polyols are not present in the polymer polyols herein. As used herein, the term polybutadiene polyols includes hydroxyl functional polyolefins such as polybutadiene diol, polybutadiene copolymers and/or polyols of polybutadiene that contain one or more groups which are reactive with isocyanate groups and/or known to be suitable or capable of functioning as a base polyol in a polymer polyol In accordance with the present invention, the polymer polyols herein may additionally comprise polybutadiene. As used herein, the term "polybutadiene" refers to homopolymers of polybutadiene, which preferably have a number average molecular weight of 1000 to 10,000, and more preferably of 3000 to 6000. It should also be noted that this polybutadiene is free of hydroxyl groups and free of other groups which are reactive with isocyanate groups. A particularly preferred homopolymer of polybutadiene is commercially available as Ricon® 131 from Cray Valley USA. When polybutadiene is added as a separate component or reactant in the polymer polyols herein, it is typically added in an amount of from 0.03 to 1%, and preferably from 0.1 to less than 0.5% by weight, based on 100% by weight of the polymer polyol.

Suitable preformed stabilizers for the present invention are high potency preformed stabilizers which are known in the art and include without limitation those described in the references discussed herein. Preferred preformed stabilizers include those discussed in, for example, U.S. Pat. No. 4,148,840 (Shah), U.S. Pat. No. 5,196,476 (Simroth), U.S. Pat. No. 5,268,418 (Simroth), U.S. Pat. No. 5,364,906 (Critchfield) and U.S. Pat. No. 6,013,731 (Holeschovsky et al), the disclosures of which are hereby incorporated by reference.

In accordance with the present invention, the amount of high potency preformed stabilizer (B) in the present invention is typically at least about 0.25%, preferably at least about 2%, more preferably at least about 4% and most preferably at least about 5% by weight, based on the total weight of the polymer polyol. It is also typical to use the high potency preformed stabilizer (B) in accordance in the present invention in amounts of 35% by weight or less, preferably of 32% by weight or less, more preferably of 27% by weight of less, and most preferably of 22% by weight or less, based on the total weight of the polymer polyol. The amount of high potency preformed stabilizer in the polymer polyols of the present invention may range from any combination of these upper and lower values, inclusive, e.g. from 0.25% to 35%, preferably from 2% to 32%, more preferably from 4% to 27% and most preferably from 5% to 22% by weight, based on the total weight of the polymer polyol.

In one embodiment of the present invention, the preformed stabilizer comprises from 0.5 to 13% by weight, based on 100% of the preformed stabilizer, of polybutadiene. It is preferred that when polybutadiene is present in the preformed stabilizer, it is preferably present in an amount of from 1 to 6% by weight, based on 100% by weight of the preformed stabilizer. The polybutadiene may be incorporated into the preformed stabilizer as either an independent feed or blended with another feed component during the preformed stabilizer preparation process.

Suitable compounds to be used as the ethylenically unsaturated monomers, i.e. component (C) the present invention, include, for example, those ethylenically unsaturated monomers described above with respect to the preformed stabilizer. Suitable monomers include, for example, styrene monomer, acrylonitrile, methacrylate, methyl methacrylate, preferably acrylonitrile and styrene monomer, with styrene monomer being particularly preferred. Other monomers include, for example, aliphatic conjugated dienes such as isoprene, 2,4-hexadiene, etc; monovinylidene aromatic monomers such as styrene monomer, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)-acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene monomer and its derivatives, acrylonitrile, methyl acrylate, methyl methacrylate, vinylidene chloride, with styrene monomer and acrylonitrile being particularly preferred monomers.

In accordance with the present invention, virtually any ethylenically unsaturated monomer except for butadiene is suitable herein as component (C). Thus, butadiene is excluded from component (C), the ethylenically unsaturated monomer.

It is preferred that styrene monomer and acrylonitrile are used in sufficient amounts such that the weight ratio of styrene monomer to acrylonitrile (S:AN) is from about 80:20 to 20:80, preferably from about 80:20 to 30:70, more preferably from about 75:25 to 40:60, and most preferably from about 75:25 to about 50:50. A particularly preferred weight ratio of styrene monomer to acrylonitrile is from about 70:30 to about 60:40. These ratios are suitable for polymer polyols and the processes of preparing them.

Overall, the solids content present in the polymer polyols of the present invention is greater than about 20% by weight, preferably at least about 30%, and most preferably at least about 40% by weight, based on the total weight of the polymer polyol. The solids content present in the polymer polyols is about 75% by weight or less, preferably about 70% by weight or less, more preferably about 65% by weight or less, and most preferably about 60% by weight or less, based on the total weight of the polymer polyol. The polymer polyols of the present invention typically has a solids content ranging between any combination of these upper and lower values, inclusive, e.g. from about 20% to 75% by weight, preferably from about 30% to 70% by weight, more preferably from about 30% to about 65% by weight, and most preferably from about 40% to about 65% by weight, based on the total weight of the polymer polyol.

Suitable free-radical polymerization initiators to be used as component (E) in the present invention include initiators such as, for example, peroxides including both alkyl and aryl hydroperoxides, peroxyesters, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), i.e, AIBN, 2,2'-azo bis-(2-methylbutyronitrile), i.e. AMBN, diethyl-2,2'-azobis(isobutyrate), i.e. DEAB, etc.

Useful initiators also include, acyl peroxides such as didecanoyl peroxide and dilauroyl peroxide, alkyl peroxides such as t-butyl peroxy-2-ethylhexanoate, t-amyl peroxy-2-ethylhexanoate, t-butyl peroxy pivalate, t-amyl peroxy pivalate, di-(2-ethylhexyl)peroxy-dicarbonate, di-n-propyl peroxydicarbonate, di-sec-butyl peroxydicarbonate, 3-hydroxy-1,1-dimethylbutyl peroxyneodecanoate, α-cumyl peroxyneodecanoate, 3-hydroxy-1,1-dimethylbutyl peroxyneoheptanoate, α-cumyl peroxyneoheptanoate, t-amyl peroxy-neodecanoate, 2,5-dimethyl-2,5-di-(2-ethylhexanoylperoxy)hexane, diisononanoyl peroxide, didodecanoyl peroxide, dioctanoyl peroxide, succinic acid peroxide, t-amyl peroctoate, t-butyl perneodecanoate, t-butylperbenzoate and 1,1-dimethyl-3-hydroxybutyl peroxy-2-ethylhexanoate, dibenzoyl peroxide, 1,1,3,3-tetramethylbutyl peroxypivalate, di-(3,5,5-trimethylhexanoyl) peroxide, 1,1,3,3-tetramethylbutyl peroxy-2-ethylhexanoate, and azo catalysts such as azobis(isobutyro-nitrile), 2,2'-azo bis-(2-methoxyl-butyronitrile), and mixtures thereof. Most preferred are the acyl and peroxyester peroxides described above and the azo catalysts.

The quantity of free-radical initiator used herein is not critical and can be varied within wide limits. In general, the amount of initiator is preferably 0.05 to 2.0% by weight, more preferably 0.10 to 1.5% by weight, and most preferably 0.15 to 1.0% by weight, based on the total feed of the components. Increases in catalyst concentration result in increases in monomer conversion up to a certain point, but past this, further increases do not result in substantial increases in conversion. When a peroxide initiator is used, it is preferred that the quantity be limited to that which results in polymer polyols having good filterability without undesirable increases in the viscosity.

Suitable chain transfer agents for use as component (F) in the present invention include, for example, known to be useful in polymer polyols and the processes of preparing polyols such as those described in, for example, U.S. Pat. Nos. 3,953, 393, 4,119,586, 4,463,107, 5,324,774, 5,814,699 and 6,624, 209, the disclosures of which are herein incorporated by reference. Some examples of suitable compounds to be used as chain transfer agents include mercaptans (preferably alkyl mercaptans), alcohols, halogenated hydrocarbons (alkyl halides), ketones, enol-ethers and alkyl-substituted tertiary amines. Chain transfer agents are also commonly referred to as reaction moderators and/or as polymer control agents. These are known to control the molecular weight of the copolymerizate.

Suitable chain transfer agents include, for example, mercaptans including benzylmercaptan as well as alkyl mercaptans such as, for example, dodecylmercaptan, butylmercaptan, octylmercaptan, laurylmercaptan, cyclohexylmercaptan, etc., alkyl-substituted tertiary amines include compounds such as, for example, triethylamine, tripropylamine, tributylamine, N,N-diethylethanolamine, N-methylmorpholine, N-ethylmorpholine, N,N-diethylpiperazine, etc., alcohols include, for example, isopropanol, ethanol, methanol, tert-butanol, allyl-alcohol, etc., enol-ethers include, for example, (cyclohex-3-enylidenemethoxymethyl)-benzene, etc., halogenated hydrocarbons including, for example, carbon tetrachloride, carbon tetrabromide, chloroform, methylene chloride, etc. Other known chain transfer agents include compounds such as, for example, ethylbenzene and toluene. In accordance with the present invention, preferred chain transfer agents include isopropanol, ethanol, tert-butanol, toluene, ethylbenzene, triethylamine, dodecylmercaptan, octadecylmercaptan, etc.

Chain transfer agents are employed in amounts of from 0.1% by weight, preferably of at least about 1%, more preferably at least about 2% and most preferably at least about 3% by weight. Chain transfer agents are also employed in amounts of less than or equal to 25% by weight, preferably less than or equal to about 20%, more preferably less than or equal to 15% and most preferably less than or equal to about 10% by weight. The weight basis for the chain transfer agent is the total weight of all the components charged to reactor. The chain transfer agent may be employed in any amount ranging between any combination of these lower and upper values, inclusive, e.g., from 0.1% to about 25% by weight, preferably from about 1% to about 20% by weight, more preferably from about 2% to about 15% by weight and most preferably from about 3% to about 10% by weight.

The polymer polyols are preferably produced by utilizing a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol.

The temperature range is not critical and may vary from about 80° C. to about 150° or perhaps greater, the preferred range being from about 90° C. to about 140° C., more preferably from about 100° C. to about 135° C., and most preferably from about 110° C. to about 130° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor.

The polymer polyols of the present invention comprise dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer polyols are highly useful, particularly where the end use application requires as little scorch as possible.

In accordance with the present invention, all of the product (viz. 100%) will pass through the filter employed in the 150 mesh filtration hindrance (filterability) test with low polymer residue (typically <5 ppm), and an exceptionally high amount of the product will pass through a 700 mesh screen within 600 seconds. It is preferred that at least 99% pass through a 700 mesh screen, and more preferred that at least 100% pass through a 700 mesh screen. In accordance with the present invention, 100% of the product should pass through the 700 mesh screen within 600 seconds. The 150 mesh filtration and 700 mesh filtration tests are described in U.S. Pat. No. 5,196, 476, the disclosure of which is herein incorporated by reference.

In accordance with the present invention, foams may be prepared from the novel polybutadiene modified polymer polyols described herein. These foams comprise the reaction product of a polyisocyanate, with an isocyanate-reactive component comprising the novel polybutadiene modified polymer polyols described herein, optionally, in the presence of a blowing agent, a catalyst and a surfactant. In addition, crosslinking agents, chain extenders, surfactants, and other additives and auxiliary agents which are known to be useful in preparing foams may also be present.

The process of preparing the foams comprises reacting a polyisocyanate component, with an isocyanate-reactive component comprising the novel polybutadiene modified polymer polyols described herein, in the presence of a blowing agent and at least one catalyst. In addition, crosslinking agents, chain extenders, surfactants, and other additives and auxiliary agents may also be present.

Suitable polyisocyanates comprise those known in the art, particularly aromatic polyisocyanates such as, for example, toluene diisocyanate, diphenylmethane diisocyanate, etc. These are known in the field of polyurethane chemistry.

The isocyanate-reactive component for preparing the polyurethane foams comprises the novel polybutadiene modified polymer polyols described herein. It is also possible that the isocyanate-reactive component comprises (1) the above described novel polybutadiene modified polymer polyols and (2) a conventional isocyanate-reactive component such as, for example, a polyoxyalkylene polyol, a polyether polyol, a polyester polyol, etc. Lower molecular weight isocyanate-reactive components such as crosslinkers and/or chain extenders may also be present.

In accordance with a preferred embodiment of the present invention, foams (preferably molded foams) may be prepared from an isocyanate-reactive component that comprises (1) from 5 to 100% (preferably from 10 to 75%, more preferably from 15 to 70%, most preferably from 20 to 65% and most particularly preferably from 25 to 50%) by weight of the polybutadiene modified polymer polyol described herein, and (2) from 0 to 95% (preferably from 25 to 90%, more preferably from 30 to 85%, most preferably from 35 to 80% and most particularly preferably from 50 to 75%) by weight of a conventional isocyanate-reactive component such as a polyether polyol, a polyester polyol, a polyoxyalkylene polyol, etc. The sum of the %'s by weight of components (1) and (2) totals 100% by weight of the isocyanate-reactive component used to prepare the foams herein.

Suitable blowing agents for the present invention include, for example chemical blowing agents, i.e. isocyanate reactive agents that generate blowing gases, such as for example water and formic acid and physical blowing agents such as carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal. These physical blowing agents are usually added to the polyol component of the system. However, they can also be added in the isocyanate component or as a combination of both the polyol component and the isocyanate component. It is also possible to use them together with highly fluorinated and/or perfluorinated hydrocarbons, in the form of an emulsion of the polyol component. If emulsifiers are used, they are usually oligomeric acrylates which contain polyoxyalkylene and fluoroalkane radicals bonded as side groups and have a fluorine content of from about 5 to 30% by weight. Such products are sufficiently well known from plastics chemistry, e.g. EP-A-0351614. Water is the preferred blowing agent.

The amount of blowing agent or blowing agent mixture used is from 0.5 to 20%, preferably from 0.75 to 10% by weight, based in each case on the total weight of the component (B). When water is the blowing agent, it is typically present in an amount of from 0.5 to 10%, and preferably from 0.75 to 7% by weight, based on the total weight of the component (B). The addition of water can be effected in combination with the use of the other blowing agents described.

Surfactants are preferably used to prepare the foams. Surfactants are known help to stabilize the foam until it cures, Suitable surfactants for the invention are those well known in the polyurethane industry. A wide variety of organosilicone surfactants are commercially available. Examples of suitable surfactants include DC-5043, DC-5164 and DC-5169, as well as Niax L-620, a product of Momentive Performance Materials, and Tegostab B8244, a product of Evonik-Goldschmidt. Many other silicone surfactants known to those in the art may be substituted for these suitable silicones. The surfactant is typically used in an amount within the range of about 0.1 to 4, preferably from about 0.2 to 3, parts per 100 parts of isocyanate-reactive mixture.

At least one polyurethane catalyst is required to catalyze the reactions of the monol, polyols and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Suitable organoamine catalysts are tertiary amines such as trimethylamine, triethylamine, triethylenediamine, bis(2,2'-dimethylamino)ethyl ether, N-ethylmorpholine, diethylenetriamine, and the like. Preferred catalysts are amine catalysts such as, for example, bis(dimethylaminoethyl)ether in dipropylene glycol and triethylene diamine in dipropylene glycol. These are commercially available as Niax A-1 and Niax A-33, respectively.

The polyurethane catalysts are typically used in an amount within the range of about 0.05 to about 3 parts, more preferably from about 0.1 to about 2 parts, per 100 parts of isocyanate-reactive mixture.

Other optional components that may be present in the foam formulations include, for example, flame retardants, antioxidants, pigments, dyes, liquid and solid fillers, etc. Such commercial additives are included in the foams in conventional amounts when used.

The foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B"

side). An additional stream may be employed to bring in one or more specific components not included with the "B" side stream. The mixture is quickly deposited into a mold that is then closed. The foam expands to fill the mold and produce a part with the shape and dimensions of the mold.

Although less preferred, a prepolymer approach to making the foams can also be used. In this approach, a significant portion of the isocyanate-reactive mixture is reacted with the polyisocyanate, and the resulting prepolymer is then reacted with the remaining components.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the examples.
Polyol A: A propylene oxide adduct of sorbitol containing a 16% ethylene oxide cap with a hydroxyl number of 28 and a 1700 mPa·s viscosity
Base Polyol A: A propylene oxide adduct of sorbitol and glycerine containing a 17% ethylene oxide cap with a hydroxyl number of 32 and a viscosity of 1100 mPa·s
Base Polyol B: A propylene oxide adduct of glycerine containing a 20% ethylene oxide cap with a hydroxyl number of 36 and a 820 mPa·s viscosity
CTA: Isopropanol, a chain transfer agent
SAN: Styrene:acrylonitrile
TMI: Isopropenyl dimethyl benzyl isocyanate (an unsaturated aliphatic isocyanate) sold as TMI® by Cytec Industries
MDI: A monomeric MDI comprising about 42% by weight of the 4,4'-isomer of MDI, about 57% by weight of the 2,4'-isomer of MDI and the balance being the 2,2'-isomer of MDI
TBPEH: tert-Butylperoxy-2-ethylhexanoate
AIBN: 2,2'-Azobisisobutyronitrile, a free-radical polymerization initiator commercially available as VAZO 64 from E.I. Du Pont de Nemours and Co.
Isocyanate A: toluene diisocyanate comprising 80% by weight of the 2,4-isomer and 20% by weight of the 2,6-isomer, and having an NCO group content of 48.3%
Polyol B: a glycerin/sorbitol started polyether polyol containing about 81 to 82% of propylene oxide and about 17 to 18% of ethylene oxide, having a nominal functionality of about 3.5 and an OH number of about 31.5
Catalyst A: 70% by weight bis[2-dimethylaminoethyl]ether in 30% by weight dipropylene glycol, an amine catalyst, commercially available from Momentive Performance Materials as NIAX A-1
Catalyst B: 33% by weight diazabicyclooctane in 67% by weight dipropylene glycol, an amine catalyst, commercially available from Momentive Performance Materials as NIAX A-33
Surfactant A: a silicon surfactant commercially available as DC 5043
Ricon® 131: a homopolymer of polybutadiene, commercially available from Cray Valley USQ
Viscosity: Dynamic viscosities reported in mPa·s at 25° C.
The macromers were prepared as follows.
Macromer A: Prepared by heating Polyol A (100 g), TMI (0.5 g), MDI (0.5 g), and 100 ppm of CosCat 83 (i.e. bismuth (III)neodecanoate) catalyst at 75° C. for 4 hours.
Macromer B: Prepared by heating Polyol A (100 g), TMI (0.5 g), MDI (0.5 g), Ricon 131B (5 g), and 100 ppm of CosCat 83 catalyst at 75° C. for 4 hours.

Preformed Stabilizer (PFS) Preparation:

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation are disclosed in Table 1.

TABLE 1

| Preformed Stabilizer Compositions | | |
|---|---|---|
| Component | PFS A | PFS B |
| CTA type | Isopropanol | Isopropanol |
| CTA concentration in feed, wt. % | 60.0% | 60.0% |
| Macromer | Macromer A | Macromer B |
| Macromer concentration in feed, wt. % | 24.0% | 24.0% |
| Monomer concentration in feed, wt. % | 15.9% | 15.9% |
| Styrene/acrylonitrile ratio in feed, wt. % | 50:50 | 50:50 |
| TBPEH concentration, wt. % | 0.1% | 0.1% |

Polymer Polyol Preparation:

This series of examples relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total polymer in the product was calculated from the concentrations of monomers measured in the crude polymer polyol before stripping.

TABLE 2

Formulations for Polymer Polyols A-D and Controls

| | PMPO Control A | PMPO A | PMPO Control B | PMPO B | PMPO Control C[1] | PMPO C[1] | PMPO Control D[1] | PMPO D[1] |
|---|---|---|---|---|---|---|---|---|
| Base Polyol | A | A | B | B | B | B | A | A |
| Base Polyol (wt. % in feed) | 53.87 | 53.87 | 51.88 | 51.88 | 49.16 | 49.16 | 51.82 | 51.82 |
| PFS | A | B | A | B | A | B | A | B |
| PFS (wt. % in feed) | 7.17 | 7.17 | 7.28 | 7.28 | 8.33 | 8.33 | 7.33 | 7.33 |
| SAN Monomers (wt. % in feed) | 38.66 | 38.66 | 40.53 | 40.53 | 40.77[2] | 40.77[2] | 39.17[3] | 39.17[3] |
| S:AN Wt. Ratio | 64:36 | 64:36 | 63.5:36.5 | 63.5:36.5 | 67.6:32.4 | 67.6:32.4 | 67.6:32.4 | 67.6:32.4 |
| Catalyst (wt. % AIBN in feed) | 0.30 | 0.30 | 0.32 | 0.32 | 0.40 | 0.40 | 0.35 | 0.35 |
| CTA (wt % in feed) | 4.30 | 4.30 | 4.51 | 4.51 | 5.0 | 5.0 | 4.40 | 4.40 |
| Ricon ® 131 | 0 | 0.1* | 0 | 0.1* | 0 | 0.1* | 0 | 0.1* |
| Viscosity mPa · s @ 25° C. | 6843 | 6359 | 6234 | 5501 | 6313 | 5437 | 6006 | 5412 |
| Filterability - 700 mesh (sec) | 291 | 231 | 306 | 231 | 233 | 216 | 258 | 378 |

*amount in total feed as part of PFS B
[1]Contained 1.33% Vikoflex 4170 epoxidized soybean oil in the total feed
[2]Contained 3.57% of vinylidene dichloride vinylic monomer in total feed
[3]Contained 3.31% of vinylidene dichloride vinylic monomer in total feed

TABLE 3

Formulations for PMPO Control E, PMPO E1 and PMPO E2

| | PMPO Control E | PMPO E1 | PMPO E2 |
|---|---|---|---|
| Base Polyol | B | B | B |
| Base Polyol (wt. % in feed) | 51.62 | 51.62 | 51.62 |
| PFS | A | B | A |
| PFS (wt. % in total feed) | 7.75 | 7.75 | 7.75 |
| SAN Monomers (wt. % in feed) | 40.33 | 40.33 | 40.33 |
| S:AN Wt. Ratio | 63.5:36.5 | 63.5:36.5 | 63.5:36.5 |
| Wt. % AIBN in feed | 0.29 | 0.29 | 0.29 |
| CTA (wt. % in feed) | 4.65 | 4.65 | 4.65 |
| Ricon 131 | 0 | 0.1* | 0.1** |
| Viscosity mPa · s @ 25° C. | 5939 | 5573 | 5342 |
| Filterability - 700 mesh sec | 306 | 222 | 236 |

*amount in total feed as part of PFS B
**amount added independently. Not present in PFS A
Each of the PMPO's described in Table 3 was used to prepare a foam. The foam formulations are set forth in Table 4, and properties are set forth in Table 5.

TABLE 4

Foam Formulations Prepared From PMPO's in Table 2

| | Foam 1 | Foam 2 | Foam 3 |
|---|---|---|---|
| Isocyanate A | 39.57 | 39.57 | 39.57 |
| Polyol B | 60/00 | 60.00 | 60.00 |
| PMPO/parts | Control E/40.00 | E1/40.00 | E2/40.00 |
| Diethanolamine | 1.50 | 1.50 | 1.50 |
| Catalyst A | 0.10 | 0.10 | 0.10 |
| Catalyst B | 0.24 | 0.24 | 0.24 |
| Blowing Agent (water) | 3.26 | 3.26 | 3.26 |
| Surfactant A | 0.50 | 0.50 | 0.50 |
| NCO Index | 100 | 100 | 100 |

General Procedure for Making Foams:

The foams in Table 4 were prepared by mixing the polyol, the surfactant, water, catalysts, and diethanolamine in a flask to create a master blend. Then, the desired amount of polymer polyol was added to a cup containing the desired amount of master blend. The contents of the cup were mixed for 55 seconds. The desired amount of Isocyanate component necessary to give an isocyanate index of 100 was added to the cup containing the master blend and polymer polyol mixture. The contents of the cup were mixed together for 5 seconds, and the reacting mixture was quickly poured into a 150° F. water-jacketed mold. After 4.5 minutes, the foam was removed from the mold, run through a cell-opening crushing device, and then placed in a 250° F. oven for 30 minutes to post cure. After 24 hours of aging in a controlled temperature and humidity laboratory, the foams were submitted for physical property testing.

Physical properties for Foams 1-3 are reported in Table 5.

TABLE 5

Foam Properties for Foams 1-3

| | Foam 1 | Foam 2 | Foam 3 |
|---|---|---|---|
| Density (kg/m³) | 42.27 | 41.79 | 42.11 |
| Resilience (%) | 64.50 | 65.55 | 66.00 |
| IFD 25% (kPa) | 295.40 | 303.30 | 315.40 |
| IFD 50% (kPa) | 518.20 | 529.90 | 549.70 |
| IFD 65% (kPa) | 777.90 | 792.70 | 817.80 |
| CFD 50% (kPa) | 2.34 | 2.48 | 2.41 |
| Compression Set 50% | 8.67 | 6.77 | 6.95 |
| HALL 50% (kPa) | 2.28 | 2.34 | 2.41 |
| HACS 50% | 16.78 | 15.18 | 15.84 |
| Wet Set 50% | 18.35 | 15.93 | 17.12 |
| Settle (%) | 4.10 | 1.30 | 0.90 |
| Vent Collapse (cm) | 41.15 | 33.53 | 33.53 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polybutadiene modified polymer polyol comprising the free-radical polymerization product of:
    (A) one or more base polyols;
    (B) at least one preformed stabilizer;
    (C) ethylenically unsaturated monomers comprising styrene and acrylonitrile;
    and (D) polybutadiene
in the presence of
(E) at least one free radical polymerization catalyst;
and, optionally,
(F) one or more chain transfer agents;
wherein said polybutadiene is introduced into the polymer polyols through said preformed stabilizer and/or as a separate reactant, and said polybutadiene is present in the polymer polyol in an amount ranging from 0.03 to 1.0% by weight, based on 100% by weight of the polymer polyol.

2. The polybutadiene modified polymer polyol of claim 1, wherein said polybutadiene (D) is present in the polymer polyol in an amount ranging from 0.1 to 0.5% by weight, based on 100% by weight of the polymer polyol.

3. The polybutadiene modified polymer polyol of claim 1, wherein said one or more base polyols (A) comprise at least one polyether polyol having a functionality of about 2 to about 8 and an OH number ranging from about 10 mg KOH/g to about 1000 mg KOH/g.

4. The polybutadiene modified polymer polyol of claim 1, wherein said polybutadiene (D) comprises homopolymers of polybutadiene having a number average molecular weight of 1000 g/mole to 10,000 g/mole.

5. The polybutadiene modified polymer polyol of claim 1, wherein styrene and acrylonitrile are present in a weight ratio of from 80:20 to 20:80.

6. The polybutadiene modified polymer polyol of claim 1, wherein the solids content of said polymer polyols ranges from about 20% by weight up to about 75% by weight.

7. The polybutadiene modified polymer polyol of claim 1, wherein a chain transfer agent comprising isopropanol is present.

8. The polybutadiene modified polymer polyol of claim 1, wherein said free radical polymerization catalyst (E) is selected from the group consisting of peroxides, azo compounds and mixtures thereof.

9. A polybutadiene modified polymer polyol comprising the free-radical polymerization product of:
(A) one or more base polyols;
(B) at least one preformed stabilizer;
(C) ethylenically unsaturated monomers comprising styrene and acrylonitrile;
with
(D) from 0.03 to 1% by weight, based on 100% by weight of the total polymer polyol, of polybutadiene;
in the presence of
(E) at least one free radical polymerization catalyst;
and, optionally,
(F) one or more chain transfer agents.

10. A polybutadiene modified polymer polyol comprising the free-radical polymerization product of:
(A) one or more base polyols;
(B) at least one preformed stabilizer which comprises from 0.5 to 13% by weight, based on 100% by weight of the preformed stabilizer, of polybutadiene;
with
(C) one or more ethylenically unsaturated monomers;
in the presence of
(E) at least one free radical polymerization catalyst;
and, optionally,
(F) one or more chain transfer agents.

11. The polybutadiene modified polymer polyol of claim 10, wherein from 1 to 6% by weight of polybutadiene is present in the preformed stabilizer.

12. A process for the preparation of a polybutadiene modified polymer polyol comprising (I) free-radically polymerizing:
(A) one or more base polyols;
(B) at least one preformed stabilizer;
(C) ethylenically unsaturated monomers comprising styrene and acrylonitrile;
and
(D) polybutadiene
in the presence of
(E) at least one free radical polymerization catalyst;
and, optionally,
(F) one or more chain transfer agents;
wherein said polybutadiene is introduced into the polymer polyol through said preformed stabilizer and/or as a separate reactant, and said polybutadiene is present in the polymer polyol in an amount ranging from 0.03 to 1.0% by weight, based on 100% by weight of the polymer polyol.

13. The process of claim 12, wherein said polybutadiene (D) is present in the polymer polyol in an amount ranging from 0.1 to 0.5% by weight, based on 100% by weight of the polymer polyol.

14. The process of claim 12, wherein said one or more base polyols (A) comprise at least one polyether polyol having a functionality of about 2 to about 8 and an OH number ranging from about 10 mg KOH/g to about 1000 mg KOH/g.

15. The process of claim 12, wherein said polybutadiene (D) comprises homopolymers of polybutadiene having a number average molecular weight of 1000 g/mole to 10,000 g/mole.

16. The process of claim 12, wherein styrene and acrylonitrile are present in a weight ratio of from 80:20 to 20:80.

17. The process of claim 12, wherein the solids content of said polymer polyols ranges from about 20% by weight up to about 75% by weight.

18. The process of claim 12, wherein a chain transfer agent comprising isopropanol is present.

19. The process of claim 12, wherein said free radical polymerization catalyst (E) is selected from the group consisting of peroxides, azo compounds and mixtures thereof.

20. A process for the preparation of a polymer polyol comprising:
(I) free-radically polymerizing
(A) one or more base polyols;
(B) at least one preformed stabilizer;
(C) ethylenically unsaturated monomers comprising styrene and acrylonitrile;
with
(D) from 0.03 to 1% by weight, based on the weight of total polymer polyol, of polybutadiene;
in the presence of
(E) at least one free radical polymerization catalyst;
and, optionally,
(F) one or more chain transfer agents.

21. A process for the preparation of a polybutadiene modified polymer polyol comprising:
(I) free-radically polymerizing
(A) one or more base polyols;
(B) at least one preformed stabilizer which comprises from 0.5 to 13% by weight, based on 100% by weight of the preformed stabilizer, of polybutadiene;
with
(C) one or more ethylenically unsaturated monomers;
in the presence of
(E) at least one free radical polymerization catalyst;
and, optionally,
(F) one or more chain transfer agents.

22. The process of claim 21, wherein from 1 to 6% by weight of polybutadiene is present in the preformed stabilizer.

23. A foam comprising the reaction product of:
(1) a polyisocyanate component,
with
(2) an isocyanate-reactive component comprising the polybutadiene modified polymer polyol of claim 1;
in the presence of
(3) one or more catalysts,
(4) one or more blowing agents,
and
(5) one or more surfactants.

24. A polyurethane foam comprising the reaction product of:
(1) a polyisocyanate component,
with
(2) an isocyanate-reactive component comprising the polybutadiene modified polymer polyol of claim 9;
in the presence of
(3) one or more catalysts,
(4) one or more blowing agents,
and
(5) one or more surfactants.

25. A polyurethane foam comprising the reaction product of:
(1) a polyisocyanate component,
with
(2) an isocyanate-reactive component comprising the polybutadiene modified polymer polyol of claim 10;
in the presence of
(3) one or more catalysts,
(4) one or more blowing agents,
and
(5) one or more surfactants.

26. A process for preparing a polyurethane foam, comprising reacting:
(1) a polyisocyanate component,
with
(2) an isocyanate-reactive component comprising the polybutadiene modified polymer polyol of claim 1;
in the presence of
(3) one or more catalysts,
(4) one or more blowing agents,
and
(5) one or more surfactants.

27. A process for preparing a polyurethane foam, comprising reacting:
(1) a polyisocyanate component,
with
(2) an isocyanate-reactive component comprising the polybutadiene modified polymer polyol of claim 9;
in the presence of
(3) one or more catalysts,
(4) one or more blowing agents,
and
(5) one or more surfactants.

28. A process for preparing a polyurethane foam, comprising reacting:
(1) a polyisocyanate component,
with
(2) an isocyanate-reactive component comprising the polybutadiene modified polymer polyol of claim 10;
in the presence of
(3) one or more catalysts,
(4) one or more blowing agents,
and
(5) one or more surfactants.

* * * * *